United States Patent [19]

Kristofek

[11] Patent Number: 4,636,925

[45] Date of Patent: Jan. 13, 1987

[54] FRAMING PROJECTOR FOR USE IN A TRACK LIGHTING SYSTEM

[75] Inventor: Paul Kristofek, Hickory Hills, Ill.

[73] Assignee: Cooper Industries, Houston, Tex.

[21] Appl. No.: 714,010

[22] Filed: Mar. 18, 1985

[51] Int. Cl.[4] .......... H01G 5/00

[52] U.S. Cl. .......... 362/277; 362/321

[58] Field of Search .......... 362/277, 145, 147, 150, 362/321; 339/21 R

[56] References Cited

U.S. PATENT DOCUMENTS

| | | | |
|---|---|---|---|
| 2,856,831 | 10/1958 | Gipe et al. | 362/321 |
| 3,016,454 | 1/1962 | Simms | 362/321 |
| 3,246,074 | 4/1966 | Neumann et al. | 339/21 R |
| 3,503,032 | 3/1970 | Routh et al. | 339/21 R |
| 3,538,825 | 11/1970 | Taylor | 362/321 |
| 3,593,639 | 7/1971 | Starp | 362/321 |
| 4,210,955 | 7/1980 | Labrum | 362/321 |
| 4,458,303 | 7/1984 | Borns | 362/321 |
| 4,519,020 | 5/1985 | Little | 362/277 |

*Primary Examiner*—Raymond A. Nelli
*Attorney, Agent, or Firm*—E. E. Scott; A. R. Thiele

[57] ABSTRACT

A framing projector providing for alternatively mounting different optical lighting effect elements is disclosed. The projector includes a housing having a low voltage light source mounted to a removeable rear end-cap at the rear of the housing for directing a beam of light through a removeable optical effect element mounted to a removeable front end-cap. The front end-cap is adapted to alternatively mount a framing shutter system, an adjustable iris assembly, or a photographic slide and template holder. An adjustable double convex asymmetrical lens system is mounted to the front end-cap forwardly of the optical effect element and projects and focuses the image created by the optical effect element.

7 Claims, 11 Drawing Figures

FIG. 4
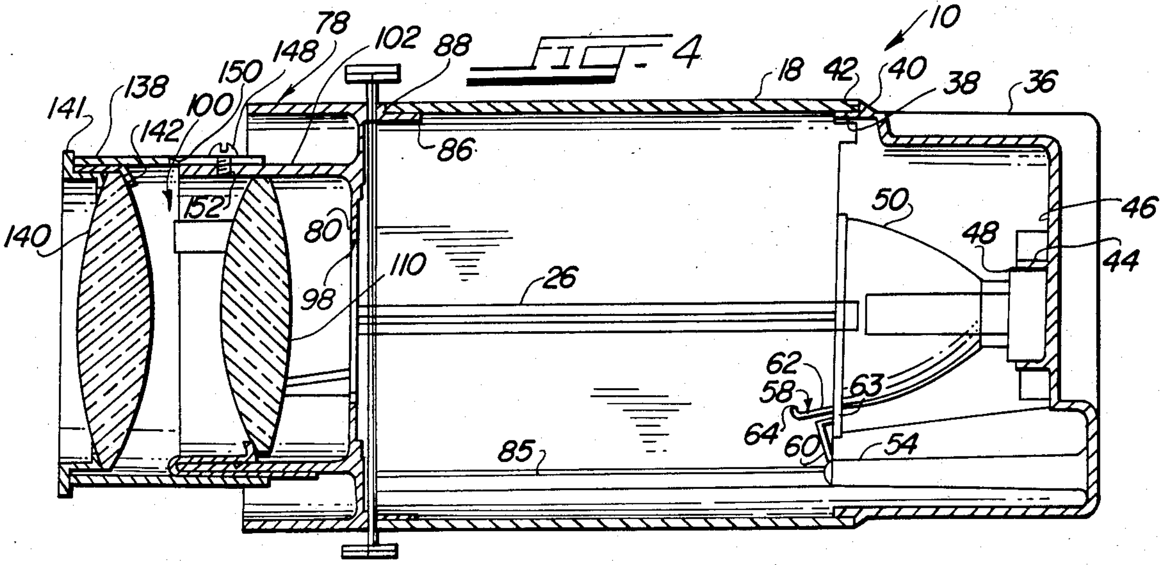
FIG. 5
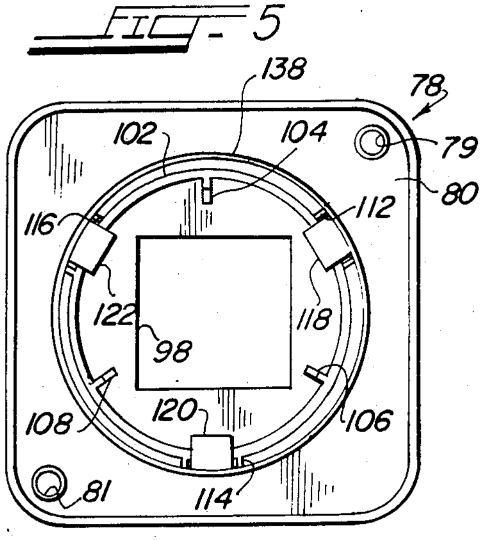
FIG. 6
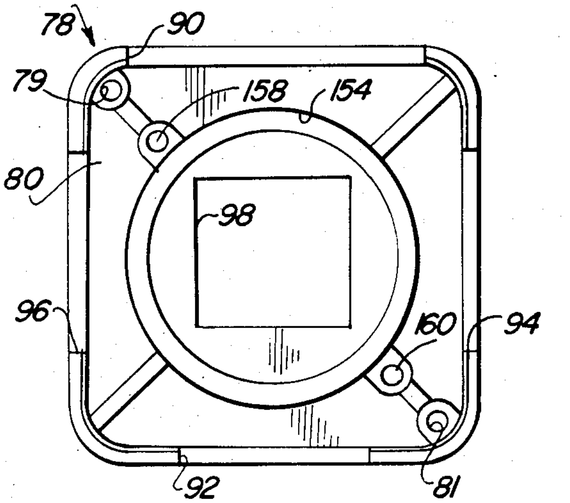
FIG. 7
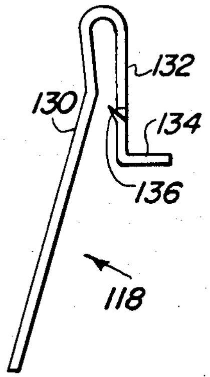
FIG. 8
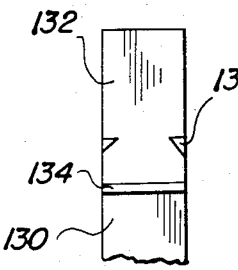
FIG. 9
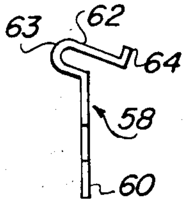
FIG. 10
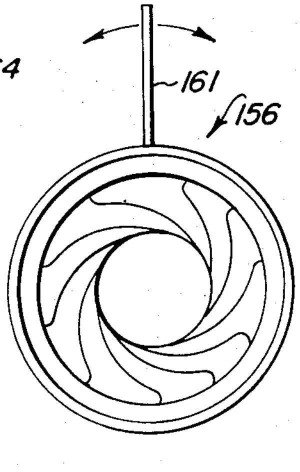
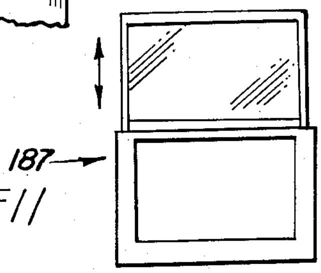
FIG. 11

FRAMING PROJECTOR FOR USE IN A TRACK LIGHTING SYSTEM

BACKGROUND OF THE INVENTION

This invention relates to a lighting fixture for use in a track lighting system. More particularly, the invention relates to a track lighting fixture of the type referred to as a framing projector. Framing projectors are normally used to project a beam of light at an object to be illuminated and most often are mounted to an electrical track on a ceiling and orientated to project a light beam at an object such as a painting hung on a wall or displayed on a table, stand or floor below the projector. These projectors are called framing projectors because they are provided with means for changing the shape of the projected light beam so as to substantially coincide with the shape of the object being illuminated or to provide for sharp light cut off in a desired pattern such as a square or rectangle. These projectors provide for illuminating only the subject object and allow different size objects to be framed within the beam of light which otherwise would require repositioning of the light fixture or object to achieve the desired lighting pattern size. For example, a large size painting or frame would require that the projector be positioned farther from the painting than would a small size painting. It can be seen that adjustable framing projectors are therefore very desirable in that they are more versatile than a simple wall wash type fixture having a fixed size and shape light pattern.

Heretofore, framing projectors have incorporated adjustable shutters for changing the size and shape of the light pattern projected therefrom but have suffered a number of shortcomings that the present invention overcomes. For example, present framing projectors have utilized complicated light reflector arrangements in combination with high voltage lamps which operate at high temperatures and complicated lens systems to project and focus the light pattern. These systems generate considerable heat and project light having less than satisfactory intensity. Also, the shutter systems incorporated in these projectors have not been able to create acceptable light patterns other than square or rectangular. A further shortcoming is found in the fact that present framing projects have been limited in the type of lighting effect that can be achieved to that of merely changing the size and shape of the light pattern.

It would therefore be highly desirable to provide for a framing projector that achieves increased light intensity, is simpler in construction than present projectors and provides for achieving a variety of alternative special lighting effects in addition to merely changing the size, and peripheral shape of the projected light beam.

SUMMARY OF THE INVENTION

According to a preferred aspect of the present invention, a framing projector is provided with means for alternatively mounting different lighting effect optical elements for achieving alternative special lighting effects.

One important aspect of the invention provides for alternatively mounting a framing shutter system, an adjustable iris assembly and a photographic slide and template holder within the projector.

According to an another important aspect of the invention, the framing projector includes a low voltage light source mounted to the back wall of a removeable rear end-cap for directing a light beam directly through the interior of the projector housing toward the optical element and a lens system.

According to another very important aspect of the invention, a removeable front end-cap is also mounted to the housing of the projector and includes means for mounting a lens system and the different desired optical effect elements.

Another feature of the invention provides for a framing shutter system having a mounting plate removeably mounted to the inner surface of the front end-cap and includes an aperture positioned coaxial with the light source. Two pairs of opposing shutter blades are mounted to the shutter mounting plate with pins positioned in intersecting elongated slot-like openings in the mounting plate and blades which provide for individual rectilinear, pivotably movement of the shutter blades.

Another very important feature of the invention provides for a pair of condensing lens mounted to the front end-cap with an outermost one of the lens being mounted in a focusing member that fits around an extension on the front end-cap and within which an innermost one of the lens is mounted. The focusing member and the outer lens are slideable axially relatively to the inner lens to achieve focusing of the light pattern.

A still further important feature of the invention provides for an counterbore in the inner surface of the front end-cap for receiving and aligning the adjustable iris assembly in place of the framing shutter system.

A further aspect of the invention provides for two pairs of opposing equally spaced apart openings into the housing interior at the interface of the front end-cap and housing through which adjustable arms on each shutter blade extend providing for adjustment of the respective shutter blades to selective positions.

Another aspect of the invention provides for frictional retention of the shutter blades at the selected positions by gently clamping each blade in its respective opening between the front end-cap and housing.

BRIEF DESCRIPTION OF THE DRAWINGS

These and other important features of the invention will become apparent after a reading of the following detailed description in conjunction with the drawings of which:

FIG. 4 is vertical longitudinal cross sectional view of the framing projector of FIG. 1 showing details of construction.

FIG. 5 is a front elevational view of the front end-cap of the projector showing details of construction.

FIG. 6 is a rear elevational view of the front end-cap of the projector showing details of construction.

FIG. 7 is a side elevational view of one focusing cylinder and lens retention clip showing details of construction.

FIG. 8 is a front elevational view of the focusing cylinder and lens retention clip of FIG. 7 showing further details of construction.

FIG. 9 is a side elevational view of the lamp retention clip showing details of construciton.

FIG. 10 is a front elevational view showing details of construction of an adjustable iris optical element for mounting to the front end-cap of FIG. 6.

FIG. 11 is a front elevational view of a photographic slide/template holder for mounting to the front end-cap of FIG. 6.

DETAILED DESCRIPTION OF THE PREFERRED EMBODIMENT

Figure 1:
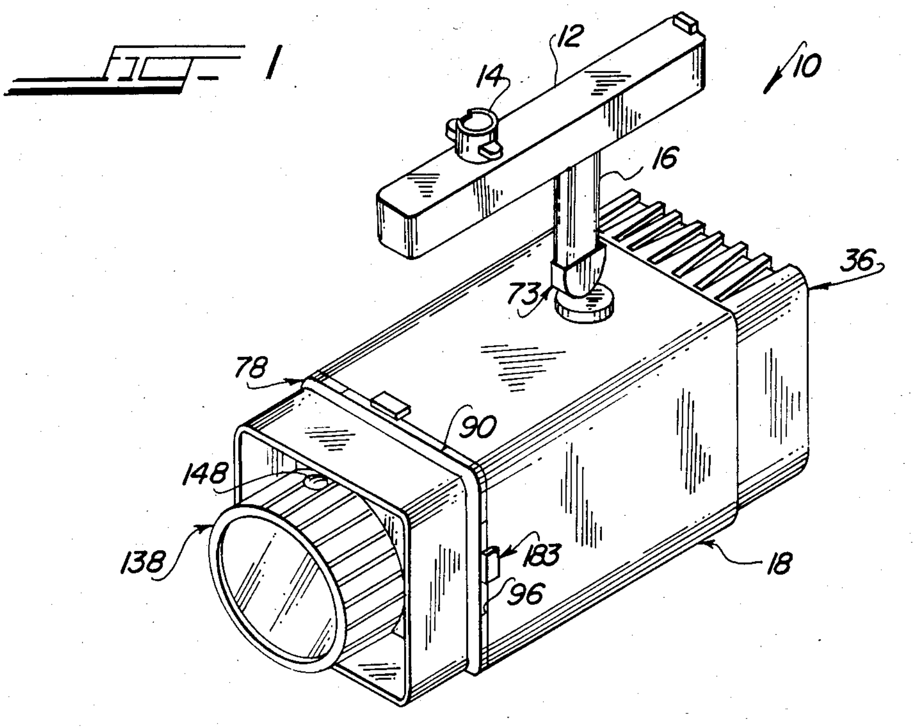
FIG. 1 is a perspective view of a framing projector embodying the principles of the invention.
Figure 2:
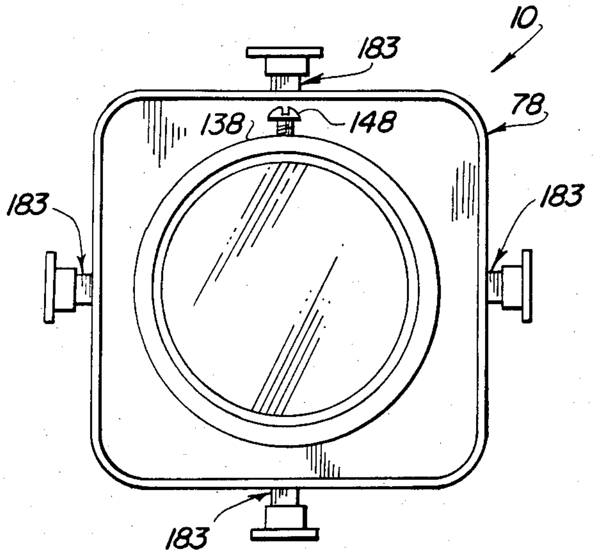
FIG. 2 is front elevational view of the framing projector of FIG. 1.

Referring to FIG. 1, there is shown a framing projector fixture 10 adapted to be fastened to an electrical track of a track lighting system. In the embodiment shown, the connection to the track is achieved through an electronic power supply assembly 12 which includes a coupler 14 well known in the art. The coupler functions to mechanically connect the transformer and fixture to the track and includes electrical contacts for electrically coupling the transformer to the electrical conductors within the track. The fixture 10 is connected to the electronic power supply assembly 12 through a hollow stem 16 that is rotatably mounted to the transformer and pivotably mounted to the fixture. The mounting arrangement provides for both rotation of the fixture within a plane lying parallel to the track and for angular positioning of the fixture within a plane lying perpendicular to the track, thereby providing for aiming of the projector at substantially all possible locations relative to the axis of the mounting stem.

Figure 3:
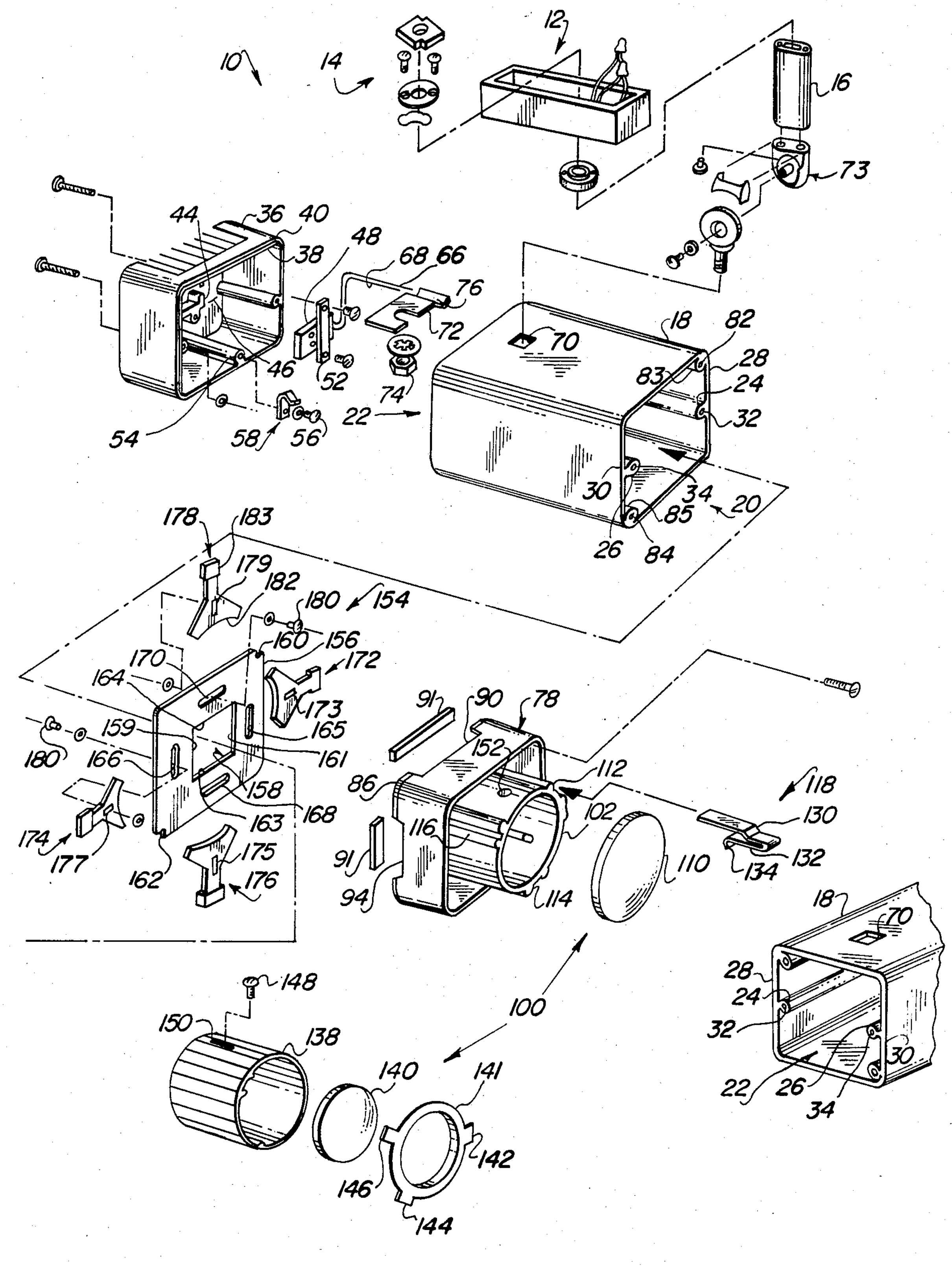
FIG. 3 is an exploded pictorial view of the framing projector of FIG. 1 employing a framing shutter showing details of construction and assembly.

Referring to FIG. 3, the fixture 10 includes a hollow housing 18 having an open front end 20 and an open rear end 22. The housing and housing end-caps described hereinbelow are shown as being generally rectilinear in cross section, but the invention is to be considered to include other possible shapes including, for example, a circular shaped housing and end-caps. The housing 18 is preferably made from extruded or otherwise formed aluminum and has a first pair of bosses 24, 26 cast into the inner surfaces of opposing housing sidewalls 28, 30. The bosses 24, 26 are elongated, generally tubular members or otherwise provided with holes 32, 34. As shown in FIG. 4, a rectilinear cup-shaped rear end-cap 36 having a peripheral lip 38 along its inner peripheral edge and a protruding circumferential flange 40 which define a circumferential shoulder 42 at the inner end of the rear end-cap is fastened to the rear end 22 of the housing such that the lip 38 fits within the housing contiguously around the inner peripheral surface of the housing and the shoulder 42 abuts the end of the housing. The rear end-cap 36 is secured to the housing with a pair of self tapping screws which threadedly engage the holes 32, 34 in the bosses 24, 26.

As shown best in FIGS. 3 and 4, a lamp socket receptacle 44 is cast integrally into the inner surface of the back wall 46 of the rear end-cap 36 and is configured to receive a lamp socket 48 of the type for holding a 12 volt MR16 lamp such as the General Electric Company's PRECISE lamp. The type MR16 lamp is the preferred light source for the projector and is of the type having two electrical contact pins for engaging the socket 48 and a parabolic reflector portion 50 for reflecting light from the lamp element forwardly, directly through the interior of the housing toward the front end. The socket 48 is retained within the socket receptacle by a strap-like bracket 52 which spans across the face of the flat socket and is secured to the back wall of the end-cap. The rear end-cap is provided with a boss 54 adapted to receive a threaded fastener, such as 56 in FIG. 3, which secures a lamp retention clip 58 at the open end of the read end-cap adjacent the reflector portion of the lamp 50. As shown in FIGS. 3, 4 and 9, the clip 58 is an elongated strap-like member formed to define a generally L-shaped piece having two legs 60, 62. One leg 60 is fastened proximate one end thereof to the rear end-cap with the fastener 56. The second leg 62 forms a rounded portion 63 at the junction with the first leg which is configured to engage the reflector without damaging the reflector surface. The second leg 62 extends outwardly from the rear end-cap and is provided with a short upturned portion 64 which provides for finger engagement of the clip. The clip can be made of spring material thereby providing for resilient engagement against the reflector. The lamp is easily removed from the socket by pulling back on the clip to disengage the rounded portion 63 from the reflector and pivoting the clip about the screw 56 providing clearance for pulling the lamp out of the socket. Electrical leads 66, 68 extend from the socket to an access hole 70 in the housing top wall and pass through the interior of the hollow stem 16 to the power supply assembly 12. An electric lead retention and positioning bracket 72 is mounted to the inner surface of the top wall of the housing with a stem mounting nut 74 that also pivotably fastens the stem mounting assembly 73 to the housing. The free end of the bracket 72 is bent to form a passage 76 between the bracket and top wall of the housing through which the leads 66, 68 pass.

Referring to FIG. 3 a front end-cap 78 is removeably fastened to the front end of the housing 18 by a pair of self-tapping screws which pass through holes 79, 81 in a transverse wall 80 of the front end-cap and threadedly engage within holes 82, 84 in the front ends of a second pair of longitudinal bosses 83, 85 at the front end of the housing 18. Referring to FIG. 4, the front end-cap 78 is also generally rectilinear shaped having the hereinabove mentioned transverse wall 80 and a peripheral lip 86 around the innermost peripheral edge of the cap. The front end-cap is also provided with a circumferential shoulder 88 which abuts against the front end of the housing when the front end-cap is secured thereagainst. The lip 86 fits within the housing against the inner peripheral surface thereof at the front end. The lip 86 and a portion of the front end-cap inner peripheral edge are provided with two pairs of opposing equally spaced apart, cut-outs 90, 92 and 94, 96, as shown in FIG. 3 and 6, which define two pairs of opposing openings into the interior of the housing for the purpose set out hereinbelow. Flexible gaskets of felt 91 are attached to the front end-cap within each cut-out and serve to environmentally seal the interior of the housing from external contaminants and to prevent the escape of light through the openings.

Now referring to FIGS. 4 and 5, the transverse wall 80 is provided with a square aperture 98 coaxial with the housing and the light source and serves to provide for passage of light directly through the front end-cap to an optical lens assembly 100. A cylindrical lens mounting extension member 102 protrudes forwardly from the transverse wall 80 coaxial with the aperture 98 and includes a first lens seat cast therein in the form of perferably at least three equally spaced apart bosses 104, 106, 108. A first, innermost, asymmetric double convex optical condensing lens 110 is positioned against the bosses 104, 106, 108 such that the bosses engage a portion of the lens surface adjacent the periphery of the lens. The external surface of the lens extension 102 includes three pairs of equally spaced apart parallel raised portions arranged longitudinally on the extensions external surface forming three grooves 112, 114, 116 within which three lens retention clips 118, 120, 122 are engaged. As best shown in FIGS. 3 and 7, each lens retention clip, such as 118, is a stamped or folded strap-like spring member having one leg 130 slideably received in one groove, such as the groove 112, and a second leg 132 folded back over the first leg 130 and extending along the interior surface of the lens mounting extension. Each clip is thereby removeably retained to the extention with the legs 130, 132 respectively against the outer and inner surfaces of the extension member. Each clip has a third flange portion 134 extending generally perpendicularly from the second leg 132 and is configured to engage the outer surface of the first lens 110 near its periphery. As shown in FIG. 7, the second leg can be provided with a sharp projection such as a barb 136 to engage the inner surface of the extension so as to help prevent the clip from sliding out of engagement with the extension.

Referring to FIGS. 3 and 4, the lens assembly 100 also includes a cylindrical focusing member 138 which coaxially surrounds the extension 102. The first leg 130 of each of the clips 118, 120, 122 has a portion adjacent to its free end which is curved upwardly, see FIG. 7, away from the outer surface of the extension member 102 and which resiliently engages against the inner surface of the focusing cylinder. The clip's legs 130 are resilient and are thereby biased against the inside of the focusing cylinder and maintain the cylinder coaxial with respect to the extension and provide for frictional, axial, slideable movement of the focusing cylinder relative to the extension member and retention of the focusing member at selected positions. A second asymmetrical double convex outer condensing lens 140 is mounted within the focusing cylinder at the outermost end thereof. A lens retention ring 141 is press fitted into the outer end of the focusing cylinder and is provided with a second lens seat configured to engage the outer surface of the second condensing lens along the periphery thereof. Three tabs 142, 144, 146 extend into the focusing cylinder at the peripheral edge of the second lens and are folded or bent to engage the inner surface of the second lens 140, thereby retaining the second lens to the ring 141 coaxially within the focusing cylinder. It can be appreciated that focusing of the light that emerges from the lens assembly is achieved by sliding the focusing cylinder fore or aft as needed. The focusing cylinder is locked to the extension at the desired position by a screw 148 which passes through a slot 150 in the focusing cylinder and engages within a threaded hole 152 in the extension member 102. The limits of movement of the focusing cylinder are defined by the length of the slot 150.

Now referring to FIG. 6, the inner surface of the transverse wall 80 is provided with means for alternatively mounting the different optical effect elements between the end of the housing 18 and the front end-cap 78 so that alternative special lighting effects can be achieved with the fixture by merely removing one optical element and attaching another different optical element to achieve the desired effect, thereby eliminating the need to replace the entire fixture with a different projector. Three optical effect elements are contemplated for use with the present fixture, however, those skilled in the art can readily devise other elements for use with the fixture and such other elements are to be considered to be within the scope of the present invention.

An optical framing shutter assembly 154, shown in FIG. 3, is removeably mounted to the inner surface of the transverse wall 80 and includes a flat mounting plate 156 that has a square shutter aperture 158 coaxial with the housing 18 and with the aperture 98 in the transverse wall. The shutter aperture 158 is defined by two pairs of opposing parallel marginal peripheral edges 159, 161, and 163, 164. The plate 156 includes a pair of cut-outs 160, 162 at opposing corners which align with the holes 82, 84 in the bosses 83, 85. The cut-outs allow the front end-cap mounting screws to pass through the plate to clamp the plate between the front ends of the bosses 83, 85 and the transverse wall 80. The mounting plate 156 is provided with two pairs of opposing parallel slots 165, 166 and 168, 170 spaced a predetermined distance from the respective marginal peripheral edges of the shutter aperture 158. As shown in FIG. 3, two pairs of opposing coplanar shutter blades 172, 174 and 176, 178 are mounted for independent rectilinear, pivotable movement across the shutter aperture 158. Retention and movement of the shutter blades are effected by including elongated openings 173, 175, 177, 179 in each blade having a configuration complementary to the slots in the plate. The openings in the blades intersect the slots in the plate and a pin 180, such as a rivet, is positioned through the intersecting openings and slots to pivotably and slideably retain the blades to the plate. Each blade can be pivoted about the pin 180 and is free to move over the length of the slots and openings in the blade and plate. Each blade also includes a curved leading edge 182 that spans the shutter aperture 158 and cooperates with the inherent optical curvature of the lens system to produce sharp reshaped, straight and parallel light cut-off at the leading edge 182. The shutter movement provides for creating a triangular pattern of light as well as any four sided configuration. Each shutter blade also includes an adjustment arm 183 extending outwardly through the openings created by the cut-out portions in the front end cap and are moveable between the limits of the cut-outs. As stated, the felt gaskets 91 prevent the escape of light past the adjustment arms. The shutter blades are gently clamped in the cut-outs between the front end-cap and the housing providing for frictional retention of each blade at selected positions.

Referring to FIG. 6, the inner surface of the transverse wall 80 includes a counterbore 154 coaxial with the aperture 98 and serves to locate and position an adjustable, optical iris assembly 156, shown in FIG. 10, coaxial with the aperture 98. The iris assembly is retained in the counterbore by a pair of screws threadedly received in diametrically opposed threaded holes 158, 160 in the transverse wall 80. The iris assembly includes an adjustment arm 161 that extends through one opening, for example that defined by the top cut-out 90, and is adjustable over the length of the cut-out, thereby defining the maximum and minimum opening of the iris aperture.

A third alternative optical effect element for mounting in the projector of the present invention is a photographic slide and/or template holder 187 shown in FIG. 11. In this embodiment, the uppermost cut-out 90 is dimensioned to receive the slide holder 187 which is removeably mounted to the inner surface of the front end-cap transverse wall by the same screws that fasten the iris assembly thereto. The slide holder protrudes from the cut-out 90 providing for insertion of different slides or templates into the projector across the aperture 98.

A framing projector constructed according to the present invention provides for substantially greater illumination, simpler structure, easier servicing and is more versatile than present framing projectors in that a variety of substantially different alternative lighting effects can be achieved with a single fixture.

Having described the details of the present invention, those skilled in the art, having the benefit of that description and the accompanying drawings, can readily devise other modifications and embodiments. Therefore, said other modifications and embodiments are to be considered to be within the scope of the appended claims.

I claim:

1. A framing projector for use in a track lighting system comprising:

a hollow housing having an open front end and an open rear end;

a read end-cap removably mounted to the rear end of said housing;

a light socket mounted to an inner surface of said rear end-cap;

a front end-cap removably mounted to said front end of said housing, said front end-cap including a transverse wall spanning across said front end of said housing and having an aperture therein coaxial with said hollow housing, said front end-cap having a substantially cylindrical extension protruding forwardly from said transverse wall coaxial with said aperture therein, said front end-cap further including two pairs of opposing cut-out portions at equally spaced apart locations on the periphery of said transverse wall defining two pairs of opposing openings into said hollow housing at said open front end thereof when said front end-cap is affixed to said housing;

an optical effects element defining an adjustable framing shutter assembly mounted at said open front end of said housing including a flat plate removably mounted to an inner surface of said transverse wall including a shutter aperture therein, said shutter aperture being coaxial with said aperture in said transverse wall;

slot means located in said flat plate at a predetermined distance from the marginal peripheral edge of said shutter aperture;

two pairs of opposing substantially coplanar shutter blades, each one of said shutter blades having a leading edge protruding substantially across said shutter aperture;

each one of said shutter blades provided with an elongated opening intersecting said slot means in said plate;

each one of said shutter blades further including an adjustment arm extending through a respective one of said openings into said housing defined by said cut-out portions in said front end-cap;

pin means extending through each of said elongated openings in each of said shutter blades and said slot means in said plate providing for independent pivotable movement of each of said blades around said pin means through an angle defined by the length of said cut-out portions and simultaneous rectilinear movement of each of said blades over the length of said intersecting slot and elongated opening;

a first lens fixedly mounted within said front end-cap extension coaxial with said aperture in said transverse wall;

a cylindrical focusing member mounted around said extension for axial slidable movement; and a second lens fixedly mounted at a front end of said focusing member, said first lens and said lens cooperating to condense and focus the light pattern which emerges from said optical effect element.

2. The framing projector as defined in claim 1 further comprising:

means for mounting said housing to said electrical track, said means for mounting providing for pivotable movement of said housing in a plane lying perpendicular to said track and for rotation of said housing in a plane lying parallel to said electrical track.

3. The framing projector as defined in claim 1 further comprising a flexible gasket secured to said front end cap in each said cut out closing each said opening into said housing.

4. The framing projector as defined in claim 1 wherein said shutter aperture in said plate is square defined by two pairs of opposing marginal parallel peripheral edges, said slot means in said plate includes a first pair of parallel elongated slots having a predetermined length and being spaced from said first pair of opposing marginal peripheral edges a predetermined distance and a second pair of parallel elongated slots in said plate having a predetermined length and being spaced from said second pair of opposing marginal peripheral edges a predetermined amount.

5. The framing projector as defined in claim 1 further comprising:

means associated with said front end-cap for mounting an alternative optical effect element for achieving an alternative lighting effect.

6. A framing projector as defined in claim 5 wherein the inner surface of said transverse wall of said front end-cap includes counterbore configured to receive and position a complementary size adjustable iris assembly coaxial with the aperture in said transvesre wall, and fastener means for removably retaining said iris assembly to said transverse wall.

7. The framing projector as defined in claim 5 wherein said alternative optical effect element is a photographic slide and template holder.

* * * * *